(12) United States Patent
Santelli

(10) Patent No.: US 7,217,217 B2
(45) Date of Patent: May 15, 2007

(54) TORQUE TRANSMISSION DIFFERENTIAL FOR MOTOR VEHICLES

(75) Inventor: Franck Santelli, Cormeilles-en-Parisis (FR)

(73) Assignee: Peugeot Citroen Automobiles S.A., Velizy Villacoublay (FR)

( * ) Notice: Subject to any disclaimer, the term of this patent is extended or adjusted under 35 U.S.C. 154(b) by 233 days.

(21) Appl. No.: 10/491,634

(22) PCT Filed: Aug. 12, 2002

(86) PCT No.: PCT/FR02/02855

§ 371 (c)(1),
(2), (4) Date: Sep. 3, 2004

(87) PCT Pub. No.: WO03/029693

PCT Pub. Date: Apr. 10, 2003

(65) Prior Publication Data

US 2005/0020397 A1    Jan. 27, 2005

(30) Foreign Application Priority Data

Oct. 4, 2001 (FR) .................................. 01 12766

(51) Int. Cl.
*F16H 48/06* (2006.01)
*F16H 57/02* (2006.01)

(52) U.S. Cl. .................................. 475/230; 74/606 R

(58) Field of Classification Search .............. 74/606 R, 74/607; 475/230, 243, 346; 29/893.1
See application file for complete search history.

(56) References Cited

U.S. PATENT DOCUMENTS

| 3,930,424 A | * | 1/1976 | Myers, Sr. .................. 475/160 |
| 4,037,492 A | * | 7/1977 | Ashauer et al. ............. 475/160 |
| 5,233,757 A | * | 8/1993 | Maguire ..................... 29/893.1 |
| 5,286,239 A | * | 2/1994 | Ito et al. ..................... 475/231 |
| 5,545,102 A | * | 8/1996 | Burgman et al. ........... 475/230 |
| 5,584,777 A |   | 12/1996 | Sander et al. |
| 5,897,453 A | * | 4/1999 | Mimura ..................... 475/246 |

FOREIGN PATENT DOCUMENTS

| DE | 100 09 961 | 9/2001 |
| EP | 0 420 149 | 4/1991 |

* cited by examiner

*Primary Examiner*—Roger Pang
(74) *Attorney, Agent, or Firm*—Leydig, Voit & Mayer, Ltd.

(57) ABSTRACT

The invention relates to a torque transmission differential for motor vehicles comprising a casing which is selectively rotated around an axis y–y'; a drive wheel axle with an axis Y–Y'; a gearing which is disposed inside the casing and which transmits the rotation movement from the case to the drive wheel axle; and a muzzle which is solidly connected to the casing and which is disposed between the gearing and the internal surface of the casing The gearing generally lies within an ellipsoid of rotation and the muzzle is more or less in the shape of an ellipsoid of revolution which is concentric to the gearing.

8 Claims, 2 Drawing Sheets

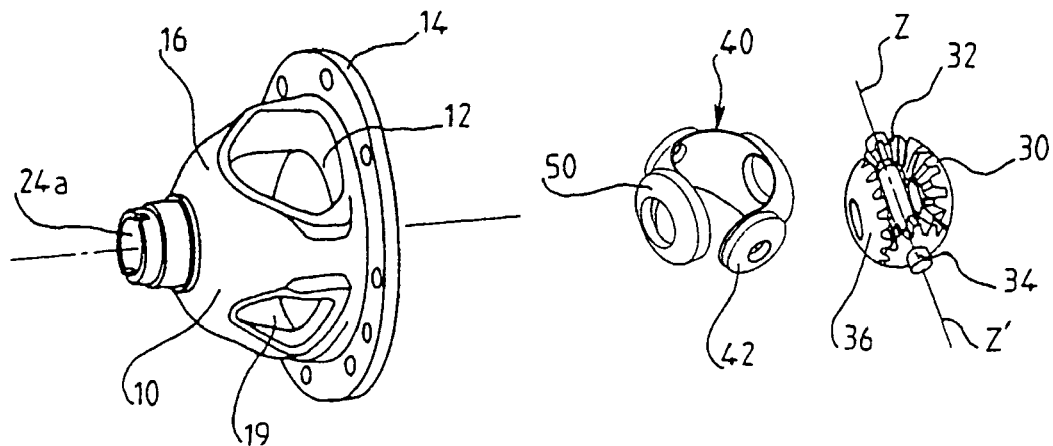
Fig. 2
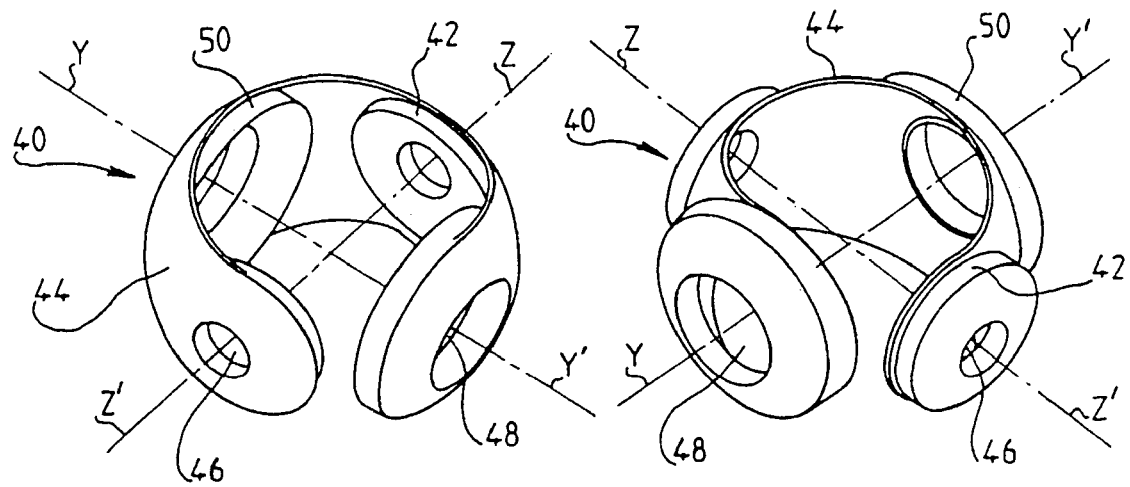
Fig. 3
Fig. 4
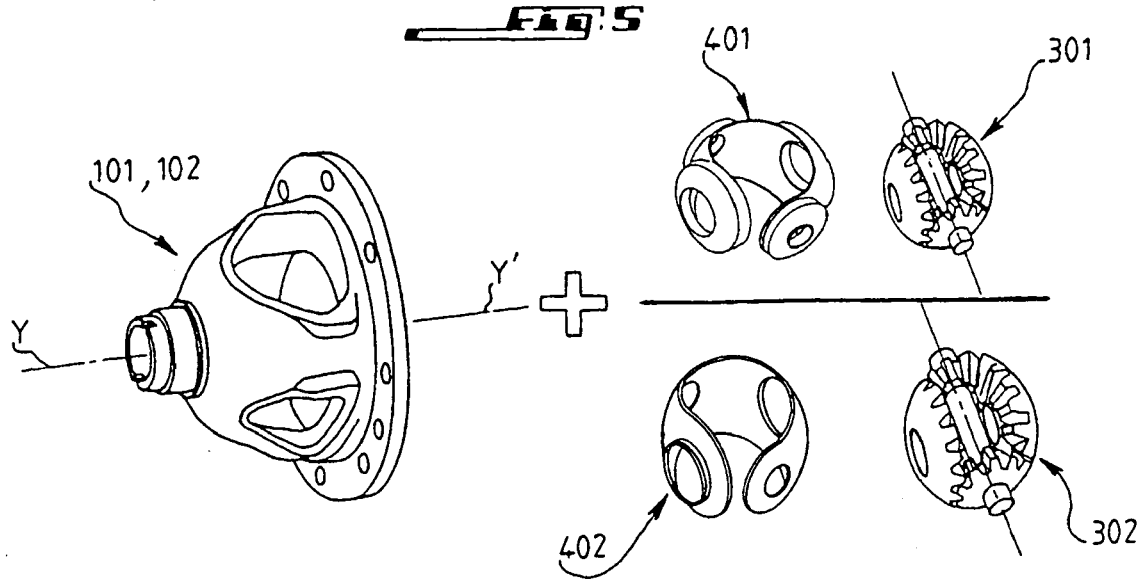
Fig. 5

TORQUE TRANSMISSION DIFFERENTIAL FOR MOTOR VEHICLES

FIELD OF THE INVENTION

The present invention relates in a general manner to differentialis for automobiles and to a method for manufacturing a family of differentialis.

More precisely, the invention relates in a first aspect to a torque transmission differential for an automobile, this differential having a case selectively rotated around an axis Y–Y', a drive wheel axle shaft with axis Y–Y', a gear train situated inside the case and which transmits the rotational movement of the case to the drive wheel axle shaft, and a muzzle joined with the case and interposed between the gear train and the internal surface of the case, the gear train including a pair of coaxial conical spider gears mounted on pins connected with the case and having axis Z–Z' perpendicular to axis Y–Y', and a pair of conical side gears having axis Y–Y' which are joined to the drive wheel axle shaft and which mesh with the spider gears, the gear train generally lying within an ellipsoid of revolution, and the muzzle having the general shape of an ellipsoid of revolution concentric with respect to the gear train.

Differentialis of this type are known from the prior art. Muzzles in particular have been used for more than ten years in differentialis that transmit low torques.

The capacity in terms of the torque that a differential is able to transmit is directly connected with the size of the ellipsoid within which the gear train lies within. There are typically two differential models: a first making it possible to transmit low torques and a second making it possible to transmit high torques. According to prior art, the size of the gear train is different for these two models, which also leads to different sizes for the case as well as for all of the accessories: friction cups, spider gear pins etc. The means for producing these elements must also be able to produce the two sizes.

In this context, the invention aims to reduce the costs connected with differentialis by making certain elements common to the two differential models.

BRIEF SUMMARY OF THE INVENTION

For this purpose, and according to a first aspect, the invention relates to a differential, which in other respects is in accordance with the generic definition given for it in the preamble above, essentially characterized by the fact that the muzzle has at least a first pair of shims.

In one possible embodiment, the muzzle consists of a thin shell having the shape of an ellipsoid of revolution, the shims of said first pair being situated on either the interior surface or exterior surface of the thin shell.

Advantageously, the shell can have the general shape of an ellipsoidal zone generated by revolution, having at least four circular openings, including two openings for passage of the pins of the spider gears and two openings for drive wheel axle shaft passage.

Preferably, the muzzle can have at least a second pair of shims, the shims of the first pair being roughly in the form of disks, each centered on an opening for passage of the pins of the spider gears and having in its center a cutout with the same diameter as the corresponding opening, the shims of the second pair being roughly in the form of disks, each centered on an opening of the drive wheel axle shaft and having in its center a cutout with the same diameter as the corresponding opening.

For example, the muzzle can have an interruption along a meridian situated between two openings.

Advantageously, the muzzle can be a molded piece made of a synthetic material such as polyamide.

Preferably, the first pair of shims has a diameter roughly equal to the diameter of the spider gears, and the second pair of shims has a diameter roughly equal to the diameter of the side gears.

In a second aspect, the invention relates to a method for manufacturing a family of torque transmission differentialis, this family including at least one differential model for transmitting a first, relatively lower torque, and a second differential model for transmitting a second, relatively higher torque, this method comprising the steps consisting of manufacturing:

a first gear train, a first muzzle and a case for the first differential model, and a second gear train, a second muzzle and a case for the second differential model, characterized by the fact that the case for the first model is identical to the case for the second model, and by the fact that the first and second muzzles are given, at least locally, differing first and second respective thicknesses, the first thickness being greater than the second.

Advantageously, it is possible for the first muzzle to have shims, and the second muzzle not to have shims.

Preferably, the first muzzle can have first shims and the second muzzle can have second shims, the thickness of the first shims being greater than that of the second shims.

BRIEF DESCRIPTION OF THE SEVERAL VIEWS OF THE DRAWINGS

Other characteristics and advantages of the invention will emerge more clearly from the description given below, on an illustrative and non-limiting basis, with reference to the appended drawings in which:

FIG. 2 is a partial exploded view of the differential of FIG. 1,

FIG. 3 is an oblique view of the muzzle of FIG. 2, according to a first embodiment, FIG. 4 is a view of the muzzle of FIG. 2, according to a second embodiment.

FIG. 5 is a partial exploded view of the two families of differentialis manufactured with the process according to the invention.

DETAILED DESCRIPTION OF THE INVENTION

Figure 1:
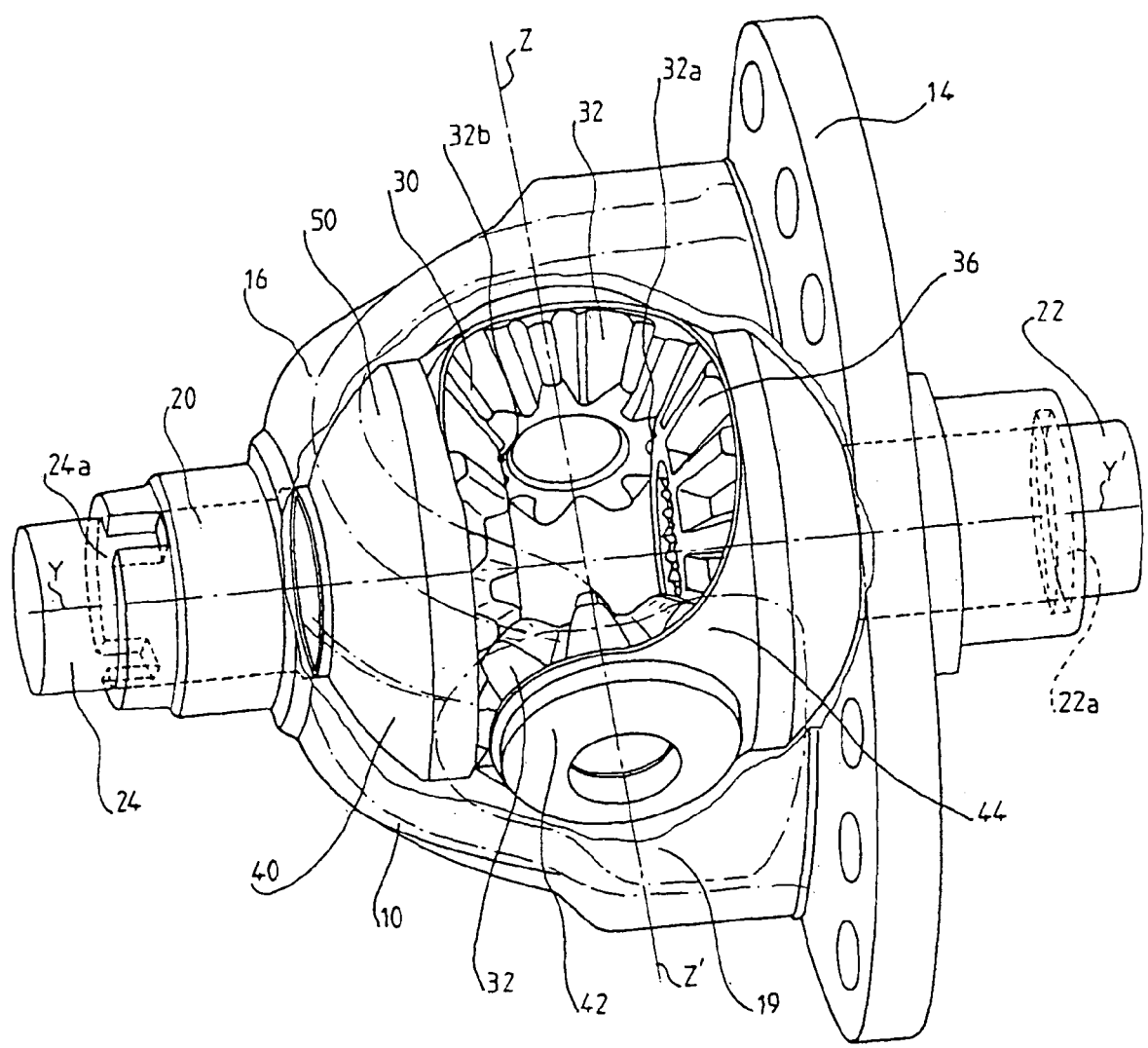
FIG. 1 is an oblique view of a differential according to the invention in the assembled state, with the spider gear pins not represented.

As shown in FIG. 1, the invention relates to a torque transmission differential for automobiles, this differential having case 10 selectively rotated around an axis Y–Y', drive wheel axle shaft 20 with axis Y–Y', gear train 30 situated inside case 10, and muzzle 40.

Gear train 30 transmits the rotational movement of case 10 to drive wheel axle shaft 20. Muzzle 40 is joined with case 10 and is interposed between gear train 30 and internal surface 12 of case 10 so as to reduce friction between gear train 30 and this internal surface 12.

Gear train 30 is of the epicycloidal type and has a pair of coaxial conical spider gears 32 mounted on pins 34 connected with case 10, and a pair of conical side gears 36 with axis Y–Y' which are joined to drive wheel axle shaft 20 and which mesh with spider gears 32. Axis Z–Z' is perpendicular to axis Y–Y'.

Gear train 30 generally lies within an ellipsoid, typically a sphere, generated by revolution around a large axis Z–Z' and having small axis Y–Y'. Muzzle 40 has the general form of an ellipsoid corresponding to the shape of gear train 30 and enveloping it in a concentric manner.

According to the invention, case 10 has the general shape of a bell with axis Y–Y', having base 14, which is selectively rotated by a device outside of the invention that is not described, and bell-shaped part 16.

Base 14 has the shape of a disk with axis Y–Y'. Bell-shaped part 16 is a piece, generated by revolution around axis Y–Y', that is flanged onto base 14.

Drive wheel axle shaft 20 has two coaxial shaft halves 22 and 24. Shaft half 22 is engaged in opening 22a situated in the center of base 14 and is joined to one gear of the pair of side gears 36 situated inside bell-shaped part 16. Shaft half 24 is engaged in opening 24a situated at the summit of bell-shaped part 16, and is joined to the other gear of the pair of side gears 36 situated inside bell-shaped part 16.

Bell-shaped part 16 also has two other openings 19 situated on axis Z–Z'. Pins 34 for spider gears 32 comprise a single shaft passing through bell-shaped part 16. Shaft 34 is attached by one of its ends in one of openings 19, and by its opposite end in the other opening 19 situated on the other side of bell-shaped part 16.

Spider gears 32 are mounted so as to rotate freely on this shaft 34, and each engages the two side gears 36 by two diametrically opposed points 32a and 32b.

Muzzle 40 consists of thin shell 44 and two pairs of shims 42 and 50. Thin shell 44 has the form of a zone of an ellipsoid generated by revolution around a large axis Z–Z' and having small axis Y–Y', this zone being delimited by two planes which are parallel to plane P formed by axes Z–Z' and Y–Y' and symmetrical with respect to this plane.

Thin shell 44 has at least four circular openings, including two openings 46 for passage of the pins and two openings 48 for passage of the drive wheel axle shaft.

Muzzle 40 has two pairs of shims, the shims of the first pair 42 being in the form of disks, each centered on an opening 46 for passage of the pins and having in its center a cutout with the same diameter as the corresponding opening, the shims of the second pair 50 being roughly in the form of disks, each centered on an opening 48 for passage of the drive wheel axle shaft and having in its center a cutout with the same diameter as the corresponding opening.

The first pair of shims 42 has a diameter roughly equal to the diameter of spider gears 32. The second pair of shims 50 has a diameter roughly equal to the diameter of side gears 36.

In a first embodiment of the invention illustrated in FIG. 3, the first and second pairs of shims 42 and 50 are situated on an interior surface of thin shell 44.

In a second embodiment of the invention illustrated in FIG. 4, the first and second pairs of shims 42 and 50 are situated on an exterior surface of thin shell 44.

Muzzle 40 has an interruption along a meridian situated between two openings, opening 46 for passage of the pins and opening 48 for passage of the wheel axle shaft.

Muzzle 40 is a molded piece made of synthetic material, typically a polymer such as polyamide.

According to a second aspect, the invention relates to a method for manufacturing a family of torque transmission differentialis, this family having at least a first differential model for transmitting a first relatively lower torque, and a second differential model for transmitting a second relatively higher torque.

This method includes the steps consisting of manufacturing:
first gear train 301, first muzzle 401 and case 101 for the first differential model, and
second gear train 302, second muzzle 402 and case 102 for the second differential model.

According to the invention, case 101 for the first model is identical to case 102, as shown in FIG. 5.

First muzzle 401 has first shims, second muzzle 402 has second shims, the thickness of the first shims being greater than the thickness of the second shims.

The second shims compensate exactly for the clearance left between gear train 302 and the internal surface of case 101/102.

Since the size of first gear train 301 is smaller than that of second gear train 302 while the size of case 101/102 is kept constant, it is necessary to increase the thickness of the first shims in order to continue to compensate for the clearance with internal surface 12.

In another embodiment illustrated in FIG. 5, first muzzle 401 has shims, and second muzzle 402 does not have shims, only thin shell 44 being interposed between gear train 302 and internal surface 12.

It is well understood that the invention enables the same case 10 to be used for transmitting different torques. Case 10 and its accessories can be standardized, and this results in considerable gains with regard to production of these pieces (narrower range) and in the management of parts.

What is claimed is:

1. A torque transmission differential for an automobile comprising a case selectively rotated around an axis Y–Y', a drive wheel axle shaft having axis Y–Y', a gear train situated inside the case and which transmits the rotational movement of the case to the drive wheel axle shaft, and a muzzle joined with the case and interposed between the gear train and an internal surface of the case, the gear train including a pair of coaxial conical spider gears mounted on a pin connected with the case and having an axis Z–Z' perpendicular to axis Y–Y', and a pair of conical side gears having an axis Y–Y' which are joined to the drive wheel axle shaft and which mesh with spider gears, the gear train generally lying within an ellipsoid of revolution, and the muzzle having a general shape of an ellipsoidal zone generated by the revolution, concentric with respect to the gear train, wherein the muzzle has at least a first pair of shims.

2. The torque transmission differential according to claim 1, wherein the muzzle comprises a thin shell having an interior surface and an exterior surface, the thin shell having the general shape of an ellipsoidal zone generated by the revolution, said first pair of shims being situated either on the interior surface or on the exterior surface of the thin shell.

3. The torque transmission differential according to claim 2, wherein the thin shell has at least four circular openings, including two openings for passage of the pins and two openings for passage of the drive wheel axle shaft.

4. The torque transmission differential according to claim 3, wherein the muzzle has at least a second pair of shims, the first pair of shims being roughly in the form of disks, each shim centered on an opening for passage of the pins and having in its center a cutout with the same diameter as the corresponding opening, the second pair of shims being roughly in the form of disks, each shim centered on an opening for the drive wheel axle shaft and having in its center a cutout with the same diameter as the corresponding opening.

5. The torque transmission differential according to claim 1, wherein the muzzle has an interruption along a meridian situated between two openings.

6. The torque transmission differential according to claim 1, wherein the muzzle is a molded piece made of a synthetic material.

7. The torque transmission differential according to claim 4, wherein the first pair of shims has a diameter roughly equal to the diameter of the spider gears, and the second pair of shims has a diameter roughly equal to the diameter of the side gears.

8. The torque transmission differential of claim 6, wherein the synthetic material comprises a polyamide.

\* \* \* \* \*